United States Patent [19]

Korchnak et al.

[11] 4,424,195
[45] Jan. 3, 1984

[54] RECOVERY OF ORGANIC EXTRACTANT FROM SECONDARY EMULSIONS FORMED IN THE EXTRACTION OF URANIUM FROM WET-PROCESS PHOSPHORIC ACID

[75] Inventors: Joseph D. Korchnak; Richard H. G. Fett, both of Lakeland, Fla.

[73] Assignee: UNC Reovery Corporation, Mulberry, Fla.

[21] Appl. No.: 149,690

[22] Filed: May 14, 1980

[51] Int. Cl.³ .......................................... C01B 25/234
[52] U.S. Cl. .................................. 423/10; 423/321 R; 423/321 S
[58] Field of Search ............. 423/10, 319, 320, 321 R, 423/321 S

[56] References Cited

U.S. PATENT DOCUMENTS 3,835,214  9/1974  Hurst et al. ............................ 423/10
4,087,512  5/1978  Reese et al. ...................... 423/321 R
4,190,633  2/1980  Smith et al. ............................ 423/10

OTHER PUBLICATIONS

*Chemical Engineers' Handbook* 5th Ed., McGraw-Hill Book Company, N.Y. (1973) pp. 21-11 to 21-12.
Landis, D. M., "Centrifugal Coalescers" *Chem. Eng. Progr.* 61 (10) pp. 58-63 (1965).

*Primary Examiner*—Deborah L. Kyle
*Attorney, Agent, or Firm*—Fleit, Jacobson, Cohn & Price

[57] ABSTRACT

Uranium in wet-process phosphoric acid is extracted with an organic extractant. The pregnant extractant is then centrifuged to separate contaminants from the extractant. Secondary emulsions obtained by separating the contaminants following centrifugation are mixed with water or an acid leaching solution. After mixing, the mixture is centrifuged to separate and recover extractant which is recycled for stripping.

13 Claims, 1 Drawing Figure

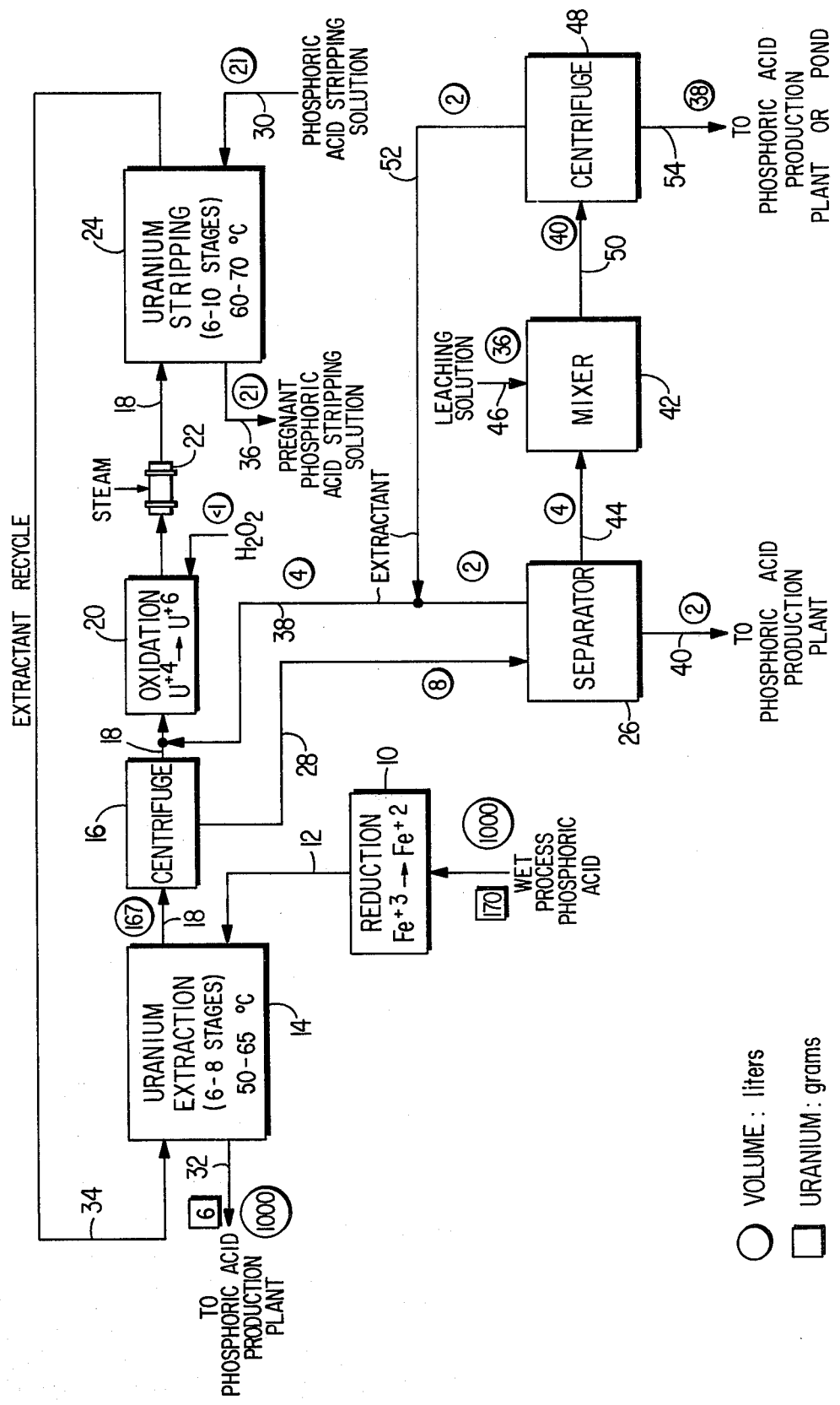

RECOVERY OF ORGANIC EXTRACTANT FROM SECONDARY EMULSIONS FORMED IN THE EXTRACTION OF URANIUM FROM WET-PROCESS PHOSPHORIC ACID

BACKGROUND OF THE INVENTION

This invention relates to the recovery of uranium from phosphate compounds and, more specifically, to the recovery of uranium from phosphoric acid produced by the acidulation of phosphate rock.

Wet-process phosphoric acid is produced by digesting phosphate rock with sulfuric acid. The chemical reaction forms phosphoric acid and calcium sulfate. The latter is filtered out, providing enormous quantities of gypsum, a waste product, which leaves an impure acid stream typically containing about 30% $P_2O_5$. Most of the uranium in the original rock shows up in the 30% acid, and various extraction processes have been developed to extract this uranium. The 30% acid is generally evaporated to about 54% "merchant acid", which is either sold or used to manufacture a variety of products, chiefly fertilizers. The higher the acid concentration, the harder it is to extract the uranium. Therefore, the 30% stage is where the uranium extraction normally takes place. If the uranium is not extracted, it ends up as a minor impurity in the various end products.

All phosphate rock contains measurable amounts of organic material such as humic acids. For example, Florida phosphate rock contains as much as 0.1% and more organic material, while western phosphate rock contains substantially more. When phosphate rock containing solid organic material is acidulated with sulfuric acid, the aqueous phase takes up the solid organic material which is of such small particle size that much of it passes through the gypsum filter. The organic material, or black particulate, causes emulsions during uranium extraction. In particular, these emulsions will collect at the organic-aqueous interface in any solvent extraction process that utilizes an organic extractant. The volume of emulsion generated is often such that flooding occurs and the equipment must be shut down and cleaned out to remove the emulsion.

The 30% acid leaving the filter is supersaturated with calcium sulfate in solution and additionally contains about 1 to 2% inorganic solids. If this acid is allowed to settle for several days, the inorganic solids along with the organic solids will settle to the bottom leaving a clear dark amber solution at the top. However, clarification by settling is not desirable in a phosphoric acid plant which typically produces 400 gallons to 1200 gallons per minute of phosphoric acid solution because of the vast storage facilities that would be required and the solids handling problems associated therewith.

In order to alleviate the problems associated with the organic material in uranium extraction, the wet-process acid is normally treated prior to extraction to remove the solid organic materials. One method of removing the solid organic material is disclosed in commonly assigned U.S. Pat. No. 4,087,512. In accordance with this method, the solid organic materials such as humic acids contained in wet-process acid from uncalcined rock are removed by contacting the acid with a liquid hydrocarbon so that the solid organic materials are suspended in an emulsion within the hydrocarbon phase. By this process, in excess of 95% by weight of the organic solids can be removed resulting in a residual or secondary emulsion concentration of about 0.1 to 0.5% by volume which will be encountered during a single batch uranium extraction. By contrast, as much as 20 to 25% by volume emulsion will be encountered during a single batch extraction of black acid produced from uncalcined phosphate rock if the organic solids are not first removed or settled.

In addition to the secondary emulsions entrained in the organic extractant during extraction from cleaned wet-process acid, the pregnant extractant also typically contains inorganic solids, entrained wet-process acid, and other contaminants. These contaminants can be removed from the pregnant extractant in a centrifuge resulting in a relatively clean extractant containing less than about 0.1% by volume contaminants which is suitable for uranium stripping. The contaminants removed from the extractant in the centrifuge primarily comprises decantable organic extractant, secondary emulsions, wet-process acid, and inorganic solids. The decantable organic extractant can be recovered and recycled to the stripping stage. However, since the secondary emulsions contain about 20 to 50% by volume extractant, discarding the secondary emulsions constitutes a loss of the extractant adding to the cost of the uranium recovery process. Therefore, there exists a need in the art for a process of recovering the extractant contained in the secondary emulsions.

Accordingly, it is an object of the present invention to provide a process for recovering extractant contained in secondary emulsions formed during uranium extraction from wet-process phosphoric acid.

A further object of the present invention is to provide a process for recovering extractant contained in secondary emulsions formed during uranium extraction from wet-process phosphoric acid which is economical and minimizes the consumption of costly reagents.

Yet a further object of the present invention is to provide an efficient and economical process for minimizing the loss of extractant during uranium recovery from wet-process phosphoric acid.

SUMMARY OF THE INVENTION

In accordance with the present invention, secondary emulsions formed during uranium extraction from wet-process phosphoric acid are treated to recover the extractant contained in the emulsions. The secondary emulsions first are subjected to water or acid leaching to separate the extractant from the remaining components of the emulsions. The leaching step is accomplished by intimately mixing the emulsions with water or an acid leaching solution. Without being limited to the exact mechanism involved, it is believed that the water or acid leaching solution removes the inorganic solids and other components of the emulsions from the organic extractant.

The leaching step is followed by a separation step in which the organic extractant is separated from the remaining components of the emulsions. This separation step can conveniently be accomplished by centrifuging the mixture resulting from the leaching step. The organic extractant which is separated is recycled for stripping and water or acid and residual inorganic solids are recovered or discarded. Using this recovery technique, at least 90% of the organic extractant bound in the secondary emulsions can be recovered.

BRIEF DESCRIPTION OF THE DRAWING

The FIGURE shows a flow sheet for a process for the recovery of uranium from wet-process phosphoric acid which incorporates the secondary emulsion treatment step in accordance with the present invention.

DETAILED DESCRIPTION OF THE PREFERRED EMBODIMENTS

In accordance with the present invention, wet-process phosphoric acid which is obtained by the acidulation of phosphate rock with sulfuric acid and which typically contains about 30–35% $P_2O_5$ is preferably treated to remove solid organic materials, such as humic acids, which interfere with phase separation during uranium extraction. One method of removing the solid organic materials is described in commonly assigned U.S. Pat. No. 4,087,510. The cleaned acid is then treated with a reducing agent, such as iron or some other known reductant, so that any of the uranium in the phosphoric acid that may be in the hexavalent state is reduced to the tetravalent state and ferric iron in the phosphoric acid is reduced to the ferrous state. Since the oxidation state of the iron tends to control the oxidation state of the uranium, substantially all of the uranium in the wet-process acid will be in the reduced tetravalent state, even at relatively high ferric iron concentrations. However, to avoid ferric iron interference with extraction, the ferric iron is preferably reduced such that the ferric iron concentration in the wet-process acid is below 10 grams/liter. This reduction is typically performed in an agitated vessel to keep the inorganic solids suspended.

The uranium in the wet-process acid, now in the tetravalent state, is extracted with an organic extractant such as an alkylphenyl acid phosphate extractant comprising a mixture of mono- and di-(alkylphenyl) esters of orthophosphoric acid. The preferred mixed esters are prepared from commercially available octylphenol or nonylphenol. The preferred mixture is approximately an equimolar mixture of the mono- and di-esters.

The extractant is dissolved in an inert diluent. Suitable inert diluents include, for example, aliphatic hydrocarbons, aromatic hydrocarbons, aromatic petroleum fractions, and chlorinated hydrocarbons. The preferred diluents are refined high-boiling, high-flash point petroleum fractions containing 10 to 50% by volume naphthenes with the balance being principally aliphatic. Specific examples of useful diluents include kerosene, hexane, etc. The extractant solutions should contain from about 10 to 40% by volume, preferably about 20 to 30% by volume, of the ester mixture. Greater than 40% by volume solutions of extractant can be used, but may result in poor phase separation. In general, the volume ratio of the wet-process acid to the extractant should be about 5 to 7:1.

In carrying out this extraction step, the extractant and the wet-process acid are intimately mixed together and then the phases allowed to separate. This intimate intermixing may be accomplished either in a batch operation or in a continuous manner concurrently or countercurrently, with countercurrent flow being preferred. Apparatus for accomplishing intermixing and separation of two substantially immiscible phases are well-known in the art and any conventional apparatus can be used for this purpose. It is preferred to conduct the extraction in the aqueous continuous mode.

Preferably, the wet-process acid is maintained at a temperature of about 50° to 65° C. during this extraction step, and also during the prior cleaning and reduction steps described above. By maintaining the wet-process acid at this temperature, impurities such as calcium sulfate are kept in solution which leads to less scale formation in the system and less down time for cleanout being required. After the uranium is extracted, the wet-process acid is returned to the phosphoric acid production plant.

The pregnant extractant, which typically contains during continuous operation about 80 to 90% by volume extractant and about 10 to 20% by volume secondary emulsions, is subjected to a first centrifugation, the centrifugation being carried out in a conventional centrifuge, such as a DeLaval self-opening, bowl centrifuge, at a rotational speed above about 4000–6000 revolutions per minute (rpm) (i.e. approx. 5000 to 7000 gs, centrifugal force, about 2–4 seconds bowl residence time, and not less thn about one (1) minute between solids discharge cycles. After centrifugation, the pregnant extractant contains less than about 0.1% by volume secondary emulsions. The contaminants removed in the centrifuge are allowed to separate in a conventional separation vessel for 30 to 90 minutes, preferably 60 to 75 minutes. After separation, the contaminants separate into top, middle and bottom layers. The top layer comprises primarily decantable extractant and minor quantities of the secondary emulsions. Typically, the top layer contains about 95 to 98% by volume extractant and about 2 to 5% by volume emulsions. The top layer is decanted and recycled to stripping. The middle layer comprises almost all secondary emulsions which are treated in accordance with the present invention as described below. The bottom layer primarily comprises phosphoric acid and minor quantities of solids. Typically, the bottom layer comprises from about 95 to 97% by volume phosphoric acid and from about 3 to 5% by volume solids. The phosphoric acid and solids can be recycled to the phosphoric acid production plant.

To recover the extractant from the secondary emulsions, the secondary emulsions are subjected to a water or acid leach. It is preferred to use a water leach. However, an acid leaching solution such as a phosphoric or other mineral acid can also be used. For example, about 25 to 60% $P_2O_5$, preferably about 45 to 55% $P_2O_5$, wet-process phosphoric acid or equivalent other mineral acid can be used.

The leaching step is accomplished by first mixing the secondary emulsions and leaching solution together using techniques and equipment well-known in the art, preferably a mix pump. It is preferred to conduct the mixing at a temperature of from about 50° to about 70° C. The volume ratio of water to secondary emulsions is preferably 5 to 15:1, more preferably 9:1. The volume ratio of acid leaching solution to secondary emulsions is preferably 3 to 8:1, more preferably 4:1.

After the mixing, the mixture is fed to a centrifuge where the mixture is separated. The centrifugation can be carried out in a conventional centrifuge, such as a DeLaval continuous phase separator contrifuge, at a rotational speed above about 4000 rpms and to 6000 rpms with a bowl residence time of about 2 to 4 seconds and a solid discharge cycle time time not less than 1 minute. As a result of the centrifugation, the mixture is separated into a first portion comprising primarily extractant and a second portion comprising primarily water or acid and solids. The extractant is recycled to stripping and the acid and solids recovered or discarded.

After the pregnant extractant has been treated to eliminate the contaminants contained therein, the extractant is stripped of its uranium content. Preferably, the extractant is oxidized to convert the uranium from the tetravalent state to the hexavalent state. The preferred oxidizing agent is hydrogen peroxide added to the extractant as a 30 to 50% by volume aqueous solution. After the oxidizing agent is added, the extractant is preferably heated to approximately 60° to 70° C. to decrease the extraction coefficient and to further enhance uranium stripping.

The extractant then is stripped of its uranium content by intimately contacting the extractant with a phosphoric acid stripping solution. The concentration of the stripping solution is generally between about 25 and 35% $P_2O_5$ by weight. It is preferred to use phosphoric acid prepared from elemental phosphorus produced by the direct reduction of ore in the so-called furnace process. The furnace grade or comparable acid is preferred because it is substantially free from solvents and corrosive impurities. In general, the volume ratio of the extractant to the stripping solution should be about 6 to 10:1. As in the extraction step, the intimate intermixing of the organic and aqueous phases can be accomplished by techniques and with equipment well-known in the art, either in a batch operation or in a continuous concurrent or countercurrent operation, with the countercurrent system being preferred. Preferably, the stripping operation is accomplished in the aqueous continuous mode using conventional liquid-liquid contact techniques.

As a result of the stripping step, the uranium in the extractant is taken up by the stripping solution. The extractant withdrawn from the stripping apparatus, now substantially free of its uranium content, is recycled and contacted with fresh wet-process acid. The phosphoric acid stripping solution, after being separated from the extractant, typically contains from about 5 to 10 grams of uranium in the hexavalent state per liter of strip acid. The stripping solution can then be subjected to a second extraction/stripping cycle to obtain a product containing high purity $U_3O_8$ such as disclosed in U.S. Pat. No. 3,835,214 to Hurst et al.

In order to facilitate an easier understanding of the present invention, a flow sheet illustrating the process is provided in the FIGURE. Wet-process phosphoric acid, preferably treated to remove a substantial portion of its solid organic material content as described in U.S. Pat. No. 4,087,510, is introduced into reduction unit 10. The wet-process acid, now containing uranium primarily in the tetravalent state and impurities such as iron in reduced oxidation states, is introduced via line 12 into countercurrent uranium extraction unit 14 having 6 to 8 stages. Also introduced into unit 14 via recycle line 34 is an alkylphenyl acid phosphate extractant comprising a mixture of mono- and di-(octyl or nonylphenyl) esters of orthophosphoric acid in an inert diluent. After extraction, the extractant, now rich in uranium, is introduced into centrifuge 16 via line 18. After centrifugation, the cleaned extractant is oxidized in oxidation unit 20, heated in heat exchanger 22 and then introduced into countercurrent uranium stripping unit 24 having 6 to 10 stages via line 18, and the contaminants removed from the extractant in centrifuge 16 are introduced into separator 26 via line 28. A stripping solution comprising phosphoric acid is introduced into uranium stripping unit 24 via line 30. Extracted wet-process acid is removed from the uranium recovery system via line 32 and returned to the phosphoric acid production plant to be evaporated to 54% "merchant acid". After being stripped of its uranium content, the extractant from uranium stripping unit 24 is recycled to uranium extraction unit 14 via recycle line 34. Uranium-rich stripping solution from stripping unit 24 leaves via line 36. This stripping solution may be further treated to recover the uranium contained therein.

After separation in separator 26, three layers are obtained, namely, a top layer comprising primarily extractant, a middle layer comprising primarily secondary emulsions, and a bottom layer comprising primarily phosphoric acid and solids. Extractant decanted from the top layer in separator 26 is recycled for uranium stripping via line 38 either upstream or downstream (as shown) of centrifuge 16. The phosphoric acid and solids exit separator 26 via line 40 and are returned to the wet-process acid producer. As to the stable emulsions, they are fed to mixer 42, preferably a mix pump, via line 44. Also introduced into mixer 42 is leaching solution, preferably water, via line 46. The leaching solution/emulsion mixture is fed to centrifuge 48 via line 50. After centrifugation, extractant is removed from the centrifuge 48 via line 52 to be recycled for uranium stripping while acid and solids which are separated from the secondary emulsions are recovered or discarded via line 54.

To facilitate an understanding of the over-all uranium recovery process, typical relative volume flows and uranium concentrations are shown in the FIGURE enclosed in circles and squares, respectively. As will be readily understood by those of ordinary skill in the art, minor modifications may be made in the invention described above without in any way departing from the spirit and scope of the invention. Accordingly, it is understood that the invention will not be limited to the exact details disclosed hereinbefore, but will be defined in accordance with the appended claims.

We claim:

1. In a process for recovering uranium from wet-process phosphoric acid including extracting the uranium from the wet-process acid with an organic extractant, treating the extractant to remove secondary emulsions containing extractant formed during extraction, and stripping the uranium from the extractant into a stripping solution, the improvement comprising:
   (1) mixing the secondary emulsions with water or an acid leaching solution; and
   (2) separating the extractant from the mixture obtained in step (1) whereby the extractant is separated from the secondary emulsions.

2. The process of claim 1 wherein in step (2), the extractant is separated from the mixture by means of centrifugation.

3. The process of claim 2 wherein the centrifugation is conducted at a rotational speed above about 4000 revolutions per minutes.

4. The process of claim 1 wherein in step (1) the acid leaching solution and secondary emulsions are mixed in a volume ratio of acid leaching solution to secondary emulsions of about 3 to 8:1.

5. The process of claim 1 wherein in step (1) the water and secondary emulsions are mixed in a volume ratio of water to secondary emulsions of about 5 to 15:1.

6. The process of claim 1 wherein the extractant is an alkylphenyl acid phosphate extractant.

7. The process of claim 6 wherein the alkylphenyl acid phosphate extractant comprises a mixture of mono- and di-(octylphenyl) esters of orthophosphoric acid.

8. The process of claim 1 wherein the leaching solution is a mineral acid solution.

9. The process of claim 8 wherein the mineral acid solution is wet-process phosphoric acid.

10. The process of claim 9 wherein the wet-process phosphoric acid contains about 20 to 60% $P_2O_5$.

11. In a process for recovering uranium from wet-processing phosphoric acid including extracting tetravalent uranium from the wet-process acid with an organic extractant including a mixture of mono- and di-(octylphenyl) esters of orthophosphoric acid, treating the extractant to remove secondary emulsions containing extractant formed during extraction, and stripping the uranium from the extractant into a stripping solution, the improvement comprising:
   (1) mixing the secondary emulsions with water or a mineral acid leaching solution; and
   (2) centrifuging the mixture obtained in step (1) to separate the extractant from the secondary emulsions remaining therein, the centrifugation being conducted at a rotational speed above about 4000 revolutions per minute.

12. The process of claim 2 wherein the centrifugation is conducted at a rotational speed above about 6,000 revolutions per minute.

13. The process of claim 11 wherein the centrifugation is conducted at a rotational speed above about 6,000 revolutions per minute.

* * * * *